Dec. 30, 1924.                                          1,521,578
H. WITTEMEIER
FILTER FOR PURIFYING THE AIR
Original Filed Jan. 5, 1921     2 Sheets-Sheet 1
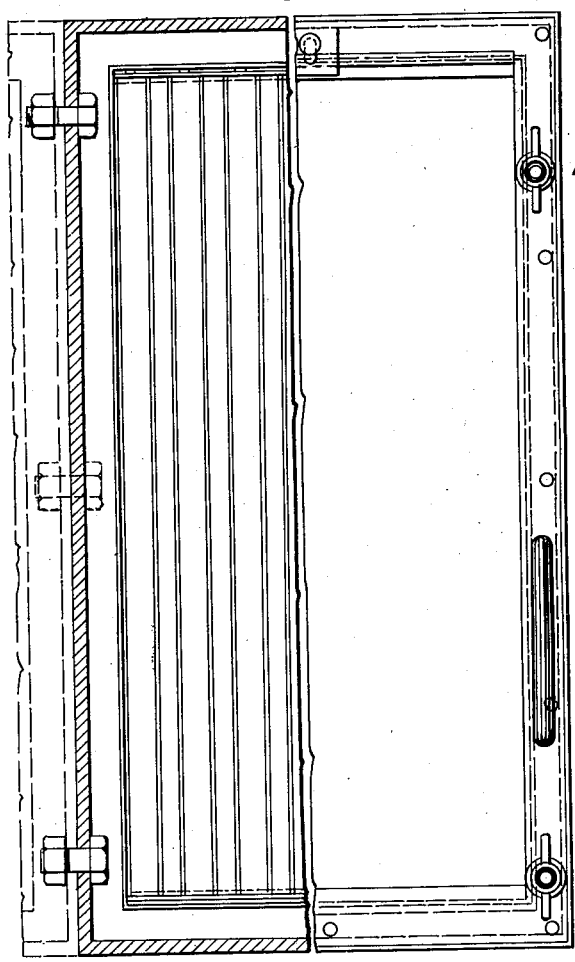
Fig:1.
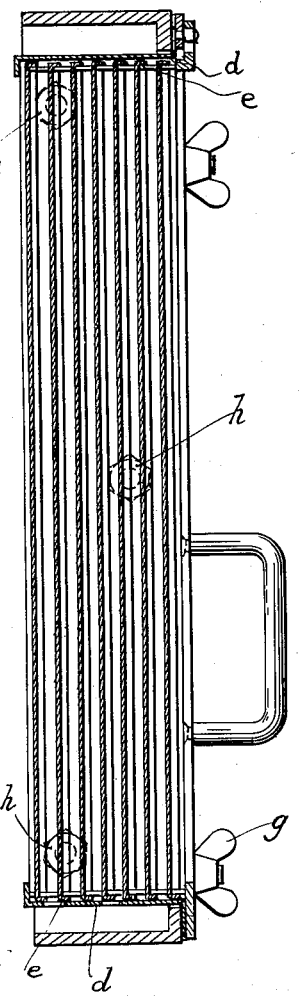
Fig:2.
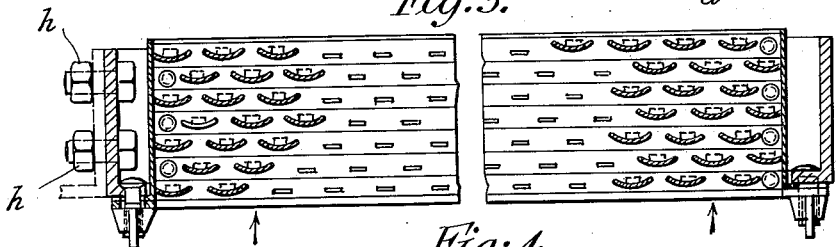
Fig:3.
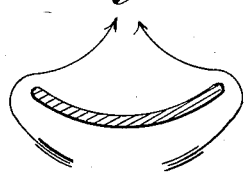
Fig:4.
INVENTOR
Hans Wittemeier
BY C. P. Goepel
ATTORNEY Dec. 30, 1924.
H. WITTEMEIER
FILTER FOR PURIFYING THE AIR
Original Filed Jan. 5, 1921   2 Sheets-Sheet 2
1,521,578
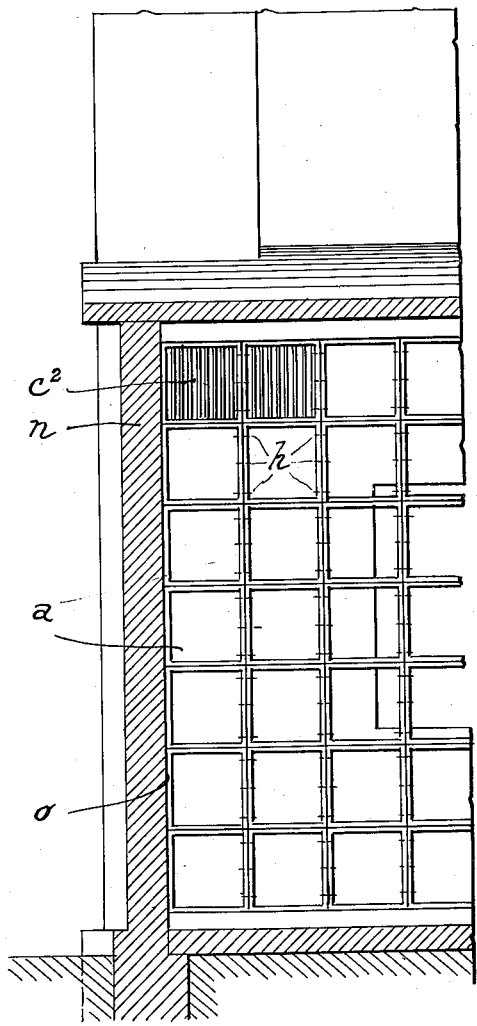
Fig:5.
INVENTOR
Hans Wittemeier
BY C. P. Goepel.
ATTORNEY Patented Dec. 30, 1924.

1,521,578

UNITED STATES PATENT OFFICE.

HANS WITTEMEIER, OF BERLIN, GERMANY.

FILTER FOR PURIFYING THE AIR.

Original application filed January 5, 1921, Serial No. 435,288. Divided and this application filed March 15, 1924. Serial No. 699,599.

*To all whom it may concern:*

Be it known that I, HANS WITTEMEIER, a citizen of Germany, and a resident of Berlin, Germany, have invented certain new and useful Improvements in Filters for Purifying the Air, of which the following is a specification.

In many technical processes and plants the purification of the air plays an important part. In heating and ventilating plants the cleaning of the air is necessary for hygienic reasons; in turbo-generators, compressors and the like the air must be deprived of dust in order to secure their reliability of operation which would be impaired by dirt that would rapidly collect in sensitive parts of the machines.

The only materials that were used hitherto for filtering purposes were substances whose structure or texture were such as to present the largest possible surface, combined with a small resistance, to the air passing through them. Such substances are, for example, porous and granulated bodies, fibrous and textile materials, and, in a smaller measure, finely distributed liquids.

Hitherto the preference has generally been given to fibrous stuffs in the form of filtering cloths. But these still have two serious drawbacks. In the first place, the clogging up of the cloth by the dust results in a rapid increase of the resistance offered to the air passing through it; and secondly, even if they are impregnated with a non-combustible agent they are not sufficiently proof against fires, which are liable to occur, especially in electric generators. This drawback had to be met by providing special fire-preventing flaps.
These drawbacks are obviated by making the filtering members of layers of non-combustible bodies of any geometrical shape such as balls, cylindrical or prismatic rods of glass, porcelain, etc., which, in order to increase their adhesiveness, are coated by a non-evaporating liquid such as gylcerine or the like.

The advantages offered by the new invention are as follows: The proneness of the filter to become rapidly clogged with impurities is removed, because the dirt-removing operation principally consists in repeatedly deflecting the innumerable air jets into which the whole air current is divided. The arrangement of the filter may be such that the untreated air first encounters a layer of comparatively large balls and then passes through additional layers of finer balls.

Another advantage is that the casing of the filter may be made of any space-saving shape such as rectangular, round, etc, whilst it is known that cloth filters are limited to rectangular shapes for technological reasons.

Special mention must be made of the extraordinarily convenient manner in which the various elements of the filter may be cleaned whilst the plant is in operation. The filter balls are simply taken out at the foot of each element of the filter, and then washed and replaced through the top. Thus a simple mechanical cleaning process is employed and the soiled filter material is always re-used after cleaning, whilst the so-called filter cloths had to be cleaned from time to time by a chemical process and were worn out very much faster. Or, the cells can be taken out without taking out separately the filtering material.

The invention is illustrated in the drawings in which—

Figure 1 is a front view partly in section,

Fig. 2 is a horizontal section,

Figure 3 is a vertical section of Figure 1, in which a special form of dust-retaining body is used in the filter.

Figure 4 is a separate view of one of the bars, showing the action of the air in respect thereto, and Figure 5 is a front view showing filter bars, formed by a plurality of frames.

Similar reference characters indicate corresponding parts.

In Figures 1, 2 and 3 a special kind of dust-retaining members or bodies is shown which is moistened with viscous liquid. The dust or moisture-retaining bodies consist of vertical rods or bars arranged in staggered rows of a sufficient number for the purpose in view; 7 rows being shown in Figure 2. Each bar is fixed by lugs *e*, one at the bottom and one at the top, which fit into holes in the bottom and top transverse bars *d* of the frame and are bent round after they are slipped through the said holes. The air to be cleaned, on entering the filter, which may be composed of any number of cells or panels, impinges upon the bars, which should be moistened, or have liquid continually trickling down them. By the time the air reaches the other side of the filter, it will be quite clean so that it leaves the filter in a pure state.

In Fig. 4 is shown an end view of one of the bars, which are cup-shaped with their convex portion facing the direction of the air flow, and their concave portion protected from the flow of air. The air in its flow envelops the bars as shown in Figure 4, and the dead space therein enclosed, serves to allow the dust to fall into the cups. The dust then adheres to the viscous coating and in the case where it trickles is carried along the bars by the flowing viscous liquid particularly if the bars are inclined. The convex sides of the bars are also coated with a viscous coating but the air flow serves to move the dust through the coating and into the cup. By dead space is understood a quiet point in the air flow, where the surface tension of the air is so low as to allow the dust to fall or drop, whereas with a considerable surface tension in the air streams the dust would be held therein. The means shown provides dead spaces of considerable capacity localizing in the general air flow.

From the drawings it will be seen that the convex-concave bars are arranged to have their convex sides facing the air flow, and that these convex concave bars are arranged staggered and relatively close together laterally of each other and above each other. As a result of the arrangement shown in Fig. 3 the air passes from the convex sides and the edges thereof and forms a dead space on the concave side of the bars. In a markedly triangular shaped space on the convex side of the bars the air is relatively quiet and this permits the dust to separate and within this triangular space a smaller spandrel like space forms itself in which the dust is not further agitated but, in perfect restfulness, settles itself upon the viscous coating. This repeats itself throughout and the air that does not form the quiescent spaces continues until it strikes one of the adjacent convex-concave bars where again quiescent spaces and spandrels are formed and dust separated and brought to rest. The air takes a tortuous and meandering path between the various bars until each and every portion of the air is subjected to periods of quiescence so as to enable the dust to separate therefrom. The viscous coating moving along the convex side when the bars are inclined has the advantage of carrying with it the gathered dust and thereby continually new and fresh surfaces of viscous coating are presented to the dust.

It will be seen that within the arrangement of the convex-concave bars a maximum of dead spaces or quiescent spaces is provided. The convex side is preferably of a form giving small resistance to the fluid passing through the filter and this is the reason the sides are made circularly convex rather than square or sharp-edged, which would be an impedance to the flow of the fluid. The concave shape of circular outline has the advantage also that the dead spaces may be readily formed and maintained. It will also be noted that all the bars are convex-concave in the same direction, which brings about the uniform air flow from the entrance side to the outlet side. These bars are uniformly symmetrically arranged with each other.

The bars may be made of waste metal strips and thereby the filters may be produced at a relatively low cost. They may also be made of stamped material which again reduces the expense of the filters. Depending upon the character of the fluid desired to be treated, the distance between the filter bars in a horizontal direction, as also in a superimposed direction, may be varied. The bars themselves may be readily cleaned since their shape makes this readily possible and because they may also be readily taken out of the filter and given a separate cleaning. Moreover, the filter bars can be readily cleaned by inverting the position of the filter and striking the bars whereby the vibrations produced by the shock will quickly throw off the accumulated dust.

It will be seen that the bars are arranged in a frame and thereby the frame and bars produce a filter cell. This filter cell may be readily inserted in the wall having the filter openings and may also be readily removed therefrom. The frames in which the filter cells are arranged are so arranged that one frame may be placed on the other laterally and vertically and these outer frames may be readily secured together by bolts and nuts $h$. By a multiplicity of such outer frames as shown in Fig. 3 a cell structure of self-supporting character may be built, into which openings the separate cells may be readily inserted by merely fastening or unfastening the screw $g$. Such a structure is shown in Figure 5, wherein a wall $n$ of a building has an opening $o$, which is filled with a plurality of frames as shown in Figure 3, and into each opening of each frame a frame like that of Figure 3 may be placed. The openings of the frames are indicated by $a$, the joining bolts by $h$ and the filter by $c^2$.

This is a divisional application of my co-pending application Serial No. 435,288, filed January 5, 1921.

I claim:

A filter having a plurality of spaced bars arranged in offset rows, each bar comprising a thin plate continuously convex from edge to edge at its outer side toward the direction of air flow to admit uninterrupted and steady deflection and flow of the divided air current about the lateral edges of the plate without creating a back swirl, each plate also being transversely concave at its inner side from edge to edge to provide a deep quiescent air space within which may be trapped and may settle the larger particles with which the air may be charged.

In testimony that I claim the foregoing as my invention I have signed my name hereunder.

HANS WITTEMEIER.